(12) United States Patent
Dickens

(10) Patent No.: US 10,593,124 B1
(45) Date of Patent: Mar. 17, 2020

(54) SYSTEMS AND METHODS FOR CONTENT CREATION

(71) Applicant: Facebook, Inc., Menlo Park, CA (US)

(72) Inventor: Joshua Barton Dickens, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 115 days.

(21) Appl. No.: 15/980,502

(22) Filed: May 15, 2018

(51) Int. Cl.
| | |
|---|---|
| *G06T 5/20* | (2006.01) |
| *G06T 3/00* | (2006.01) |
| *G06T 19/20* | (2011.01) |
| *G06T 5/00* | (2006.01) |
| *G06K 9/00* | (2006.01) |
| *G06T 7/246* | (2017.01) |
| *G06T 13/40* | (2011.01) |

(52) U.S. Cl.
CPC .......... *G06T 19/20* (2013.01); *G06K 9/00201* (2013.01); *G06T 5/002* (2013.01); *G06T 7/246* (2017.01); *G06T 13/40* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 2017/0262970 A1* | 9/2017 | Chen | G06K 9/00268 |
| 2017/0345183 A1* | 11/2017 | Chen | G06T 7/74 |

* cited by examiner

*Primary Examiner* — Iman K Kholdebarin
(74) *Attorney, Agent, or Firm* — Sheppard Mullin Richter & Hampton LLP

(57) ABSTRACT

Systems, methods, and non-transitory computer-readable media can obtain a set of transformations of an object being tracked, the set of transformations corresponding to a world coordinate space; apply a smoothing to the set of transformations; translate the set of transformations to an object tracking coordinate space; and augment a representation of the object based at least in part on the translated set of transformations.

20 Claims, 16 Drawing Sheets

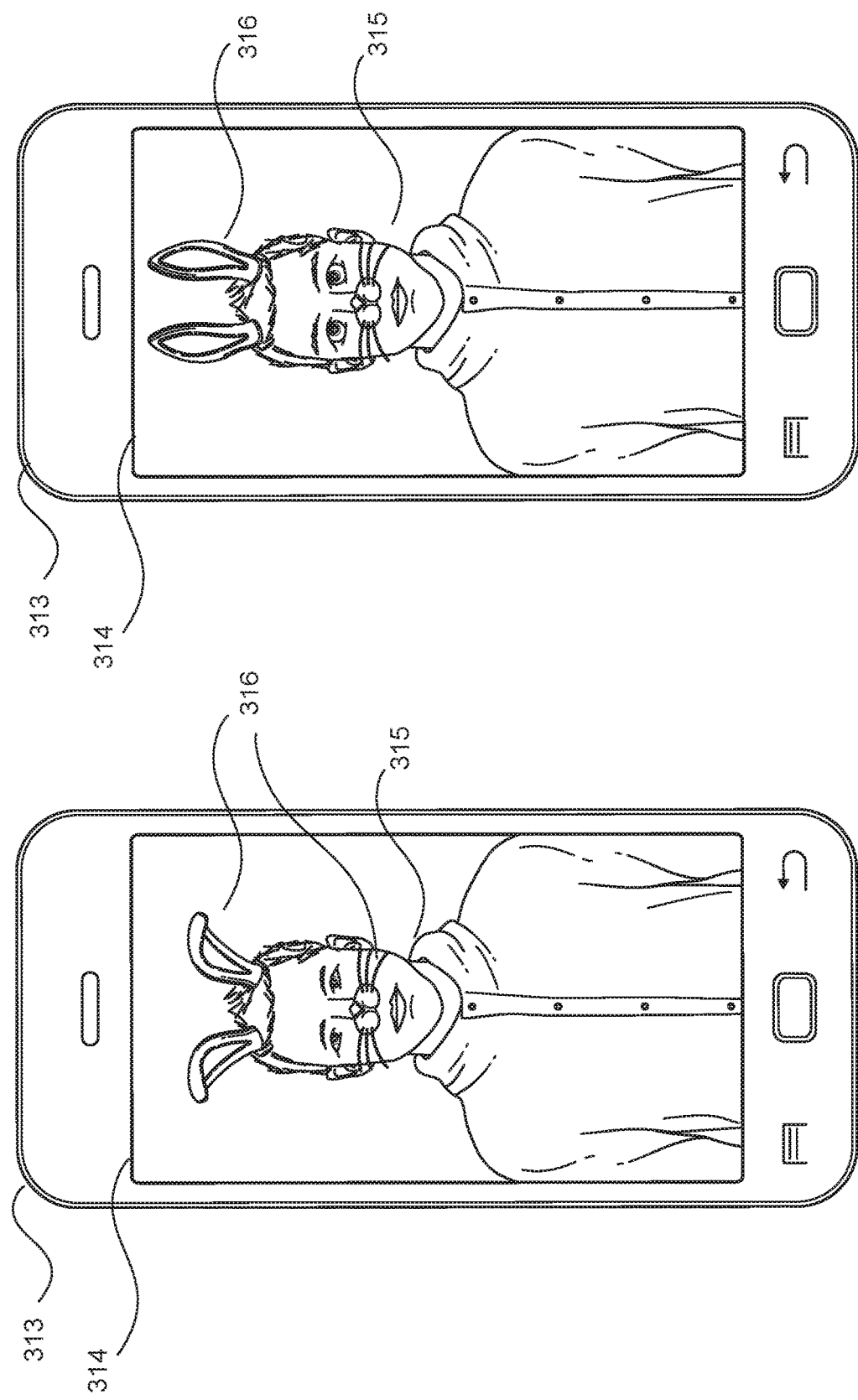

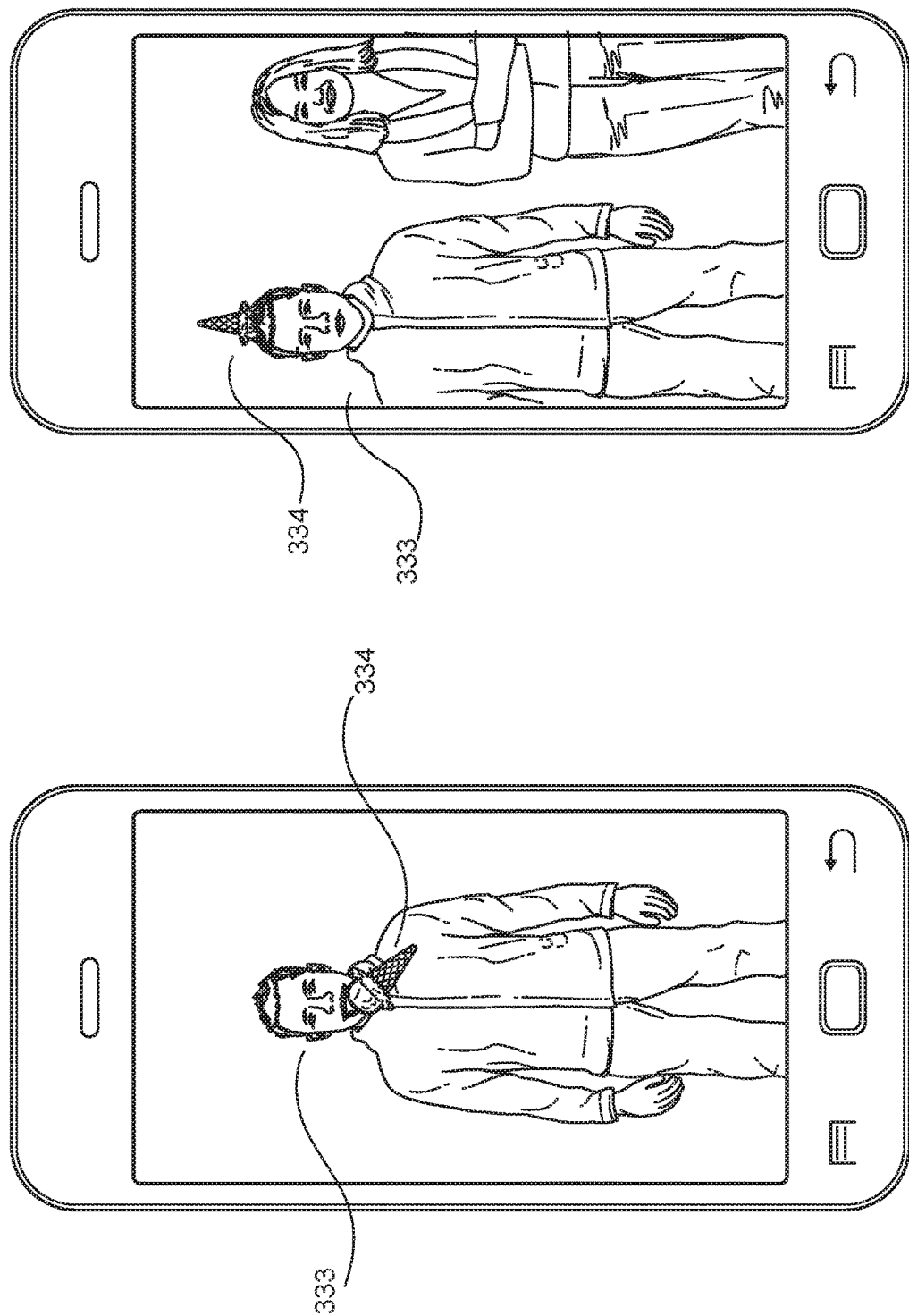

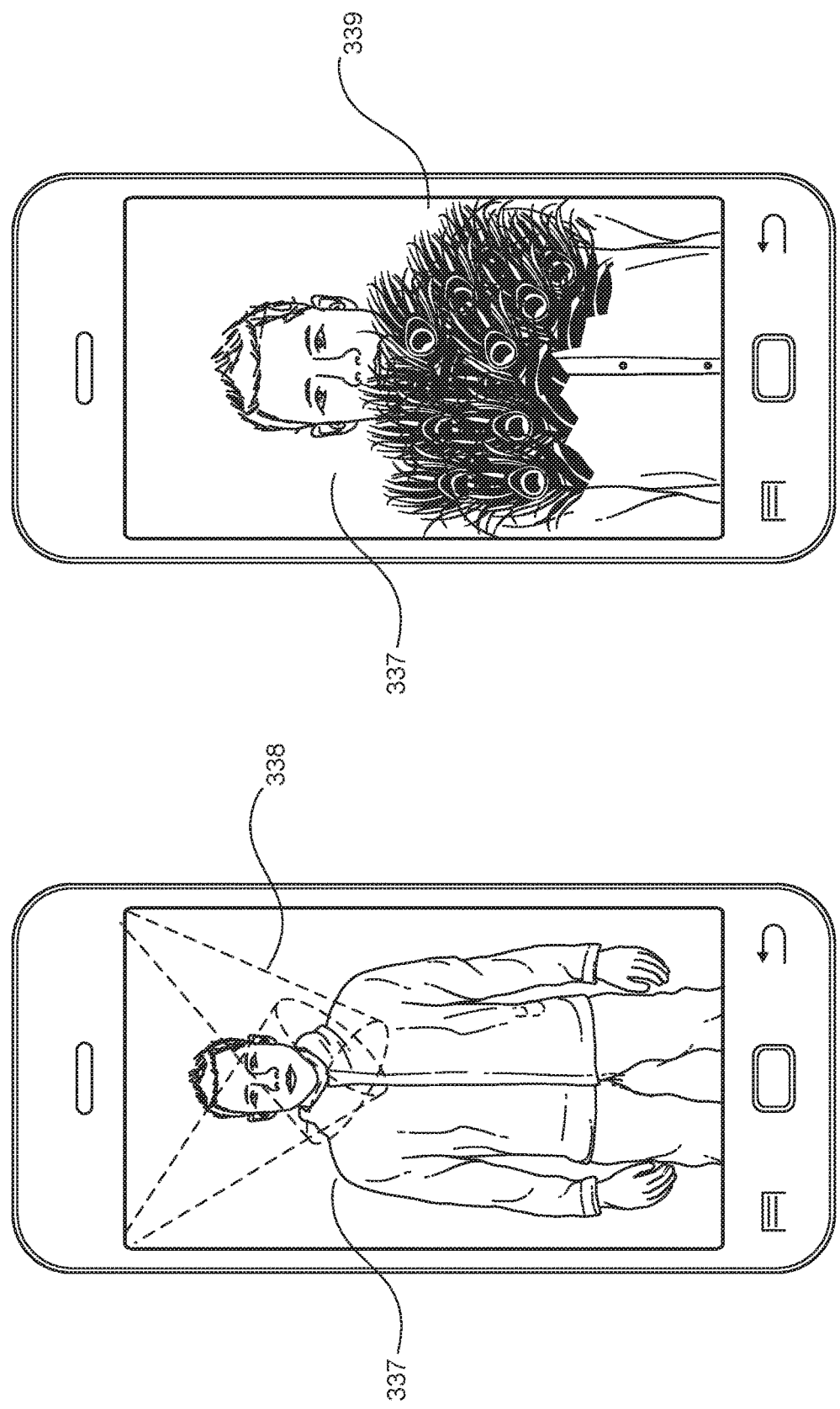

SYSTEMS AND METHODS FOR CONTENT CREATION

FIELD OF THE INVENTION

The present technology relates to the field of content creation. More particularly, the present technology relates to techniques for providing users with the ability to create and manage content.

BACKGROUND

Today, people often utilize computing devices (or systems) for a wide variety of purposes. Users can use their computing devices to, for example, interact with one another, access content, share content, and create content. In some cases, media content items can include postings from members of a social network. The postings may include text and media content items, such as images, videos, and audio. The postings may be published to the social network for consumption by others.

Under conventional approaches, users may post various media content items to a social networking system. In general, media content items posted by a first user can be included in the respective content feeds of other users of the social networking system that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to determine a graphical overlay to be applied to at least one object represented in a media content item; determine a location of the object in at least one frame of the media content item; and augment a representation of the object based at least in part on the graphical overlay, wherein the graphical overlay is animated based at least in part on changes to an orientation of the object across subsequent frames of the media content item.

In some embodiments, the graphical overlay is re-positioned across subsequent frames of the media content item based at least in part on changes to the location of the object.

In some embodiments, the graphical overlay is animated based at least in part on a pre-rendered set of video frames that capture one or more animations of the graphical overlay.

In some embodiments, the pre-rendered set of video frames are divided into segments of frames, and wherein each segment of frames corresponds to a particular object orientation.

In some embodiments, the graphical overlay is inserted in response to at least one pre-defined gesture being performed by the object as represented in frames of the media content item.

In some embodiments, a second graphical overlay is inserted in response to at least one pre-defined gesture being performed by the object and at least one different object as represented in frames of the media content item.

In some embodiments, the graphical overlay is at least one of: a mask applied to a human or an environmental animation.

Various embodiments of the present disclosure can include systems, methods, and non-transitory computer readable media configured to determine one or more graphical overlays to be applied to at least one object represented in a media content item; determine that a depth of the object as represented in one or more frames of the media content item satisfies a first threshold depth; and augment a representation of the object based at least in part on a first graphical overlay that corresponds to the first threshold depth.

In some embodiments, the systems, methods, and non-transitory computer readable media are configured to determine that the depth of the object as represented in one or more subsequent frames of the media content item satisfies a second threshold depth; and augment the representation of the object based at least in part on a second graphical overlay that corresponds to the second threshold depth.

In some embodiments, the systems, methods, and non-transitory computer readable media are configured to determine that the depth of the object as represented in one or more subsequent frames of the media content item satisfies the first threshold depth; and augment the representation of the object based at least in part on the first graphical overlay that corresponds to the first threshold depth.

In some embodiments, the systems, methods, and non-transitory computer readable media are configured to determine that the depth of the object as represented in one or more subsequent frames of the media content item satisfies a third threshold depth; and augment the representation of the object based at least in part on a third graphical overlay that corresponds to the third threshold depth.

In some embodiments, the object is augmented based at least in part on a third graphical overlay in response to at least one pre-defined gesture being performed by the object as represented in frames of the media content item.

In some embodiments, the media content item is one of: a video, looping video, or live content stream.

In some embodiments, the first graphical overlay is at least one of: a mask applied to a human or an environmental animation.

Various embodiments of the present disclosure can include systems, methods, and non-transitory computer readable media configured to obtain a set of transformations of an object being tracked, the set of transformations corresponding to a world coordinate space; apply a smoothing to the set of transformations; translate the set of transformations to an object tracking coordinate space; and augment a representation of the object based at least in part on the translated set of transformations.

In some embodiments, the representation of the object is augmented using one or more graphical overlays.

In some embodiments, the graphical overlays are attached to one or more anchor points corresponding to the object.

In some embodiments, exponential smoothing is applied to the set of transformations.

In some embodiments, the set of transformations corresponding to the world coordinate space describe transformations of the object relative to at least one camera of a computing device being used to track the object.

In some embodiments, the set of transformations describe changes to a position and rotation of the object in three-dimensional space.

In some embodiments, the object being tracked corresponds to a human face.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
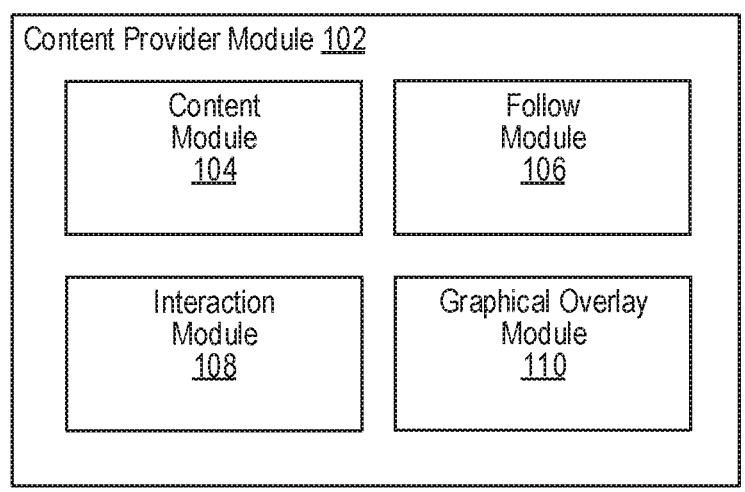
FIG. 1 illustrates an example system including an example content provider module, according to an embodiment of the present disclosure.
Figure 1:
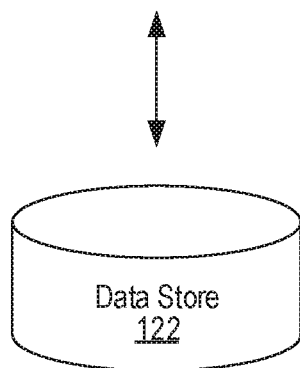

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Content Creation

People often utilize computing devices (or systems) for a wide variety of purposes. Users can use their computing devices to, for example, interact with one another, access content, share content, and create content. In some cases, media content items can include postings from members of a social network. The postings may include text and media content items, such as images, videos, and audio. The postings may be published to the social network for consumption by others.

Under conventional approaches, users may post various media content items to the social networking system. In general, media content items posted by a first user can be included in the respective content feeds of other users of the social networking system that have "followed" the first user. By following (or subscribing to) the first user, some or all content that is produced, or posted, by the first user may be included in the respective content feeds of the users following the first user. A user following the first user can prevent new content from the first user from being included in the user's content feed by simply "unfollowing" the first user. Conventional approaches, however, can have limitations that degrade the overall user experience. For example, conventional approaches may limit modification of shared media content items, visually or otherwise. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a graphical overlay to be applied to at least one object represented in a media content item is determined. A location of the object in at least one frame of the media content item is determined. A representation of the object is augmented based on the graphical overlay. The graphical overlay is animated based on changes to an orientation of the object across subsequent frames of the media content item. In various embodiments, one or more graphical overlays to be applied to at least one object represented in a media content item are determined. A determination is made that a depth of the object as represented in one or more frames of the media content item satisfies a first threshold depth. A representation of the object is augmented based on a first graphical overlay that corresponds to the first threshold depth. In various embodiments, a set of transformations of an object being tracked are obtained. The set of transformations can correspond to a world coordinate space. A smoothing is applied to the set of transformations. The set of transformations are translated to an object tracking coordinate space. A representation of the object is augmented based on the translated set of transformations. Many variations are possible.

FIG. 1 illustrates an example system 100 including an example content provider module 102, according to an embodiment of the present disclosure. As shown in the example of FIG. 1, the content provider module 102 can include a content module 104, a follow module 106, an interaction module 108, and a graphical overlay module 110. In some instances, the example system 100 can include at least one data store 122. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 530 of FIG. 5. In some instances, the content provider module 102 can be, in part or in whole, implemented within or configured to operate in conjunction or be integrated with a client computing device, such as the user device 510 of FIG. 5. For example, the content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

The content provider module 102 can be configured to communicate and/or operate with the at least one data store 122, as shown in the example system 100. The at least one data store 122 can be configured to store and maintain various types of data. For example, the data store 122 can store information describing various content that has been posted by users of a social networking system. In some implementations, the at least one data store 122 can store information associated with the social networking system (e.g., the social networking system 530 of FIG. 5). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 122 can store information associated with users, such as user identifiers, user information, profile information, user specified settings, content produced or posted by users, and various other types of user data.

The content provider module 102 can be configured to provide users with access to content that is posted through a social networking system. For example, the content module 104 can provide a first user with access to media content items through an interface that is provided by a software application (e.g., a social networking application, browser, etc.) running on a computing device of the first user. The first user can also use the interface to post media content items to the social networking system. Such media content items may include text, images, audio, videos, and live content streams, for example. In some embodiments, the software application is configured to send information describing user actions to the social networking system. Such information can include, for example, which media content items the first user has viewed, a respective view duration for each media content item, and other actions (e.g., like, comment, share, etc.) performed by the user with respect to a given media content item, to name some examples.

In various embodiments, other users of the social networking system can access media content items posted by the first user. In one example, the other users can access the media content items by searching for the first user, for example, by user name through an interface provided by a software application (e.g., a social networking application, browser, etc.) running on their respective computing devices. In some instances, some users may want to see media content items posted by the first user in their respective content feed. To cause media content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all media content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that media content items posted by the first user are no longer included in the content feed of the user. In some instances, the user may want to endorse, or "like", a media content item. In such instances, the user can select an option provided in the interface to like the desired media content item. The interaction module 108 can determine when a user likes a given media content item and can store information describing this relationship. In some instances, the user may want to post a comment in response to a media content item. In such instances, the user can select an option provided in the interface to enter and post the comment for the desired media content item. The interaction module 108 can determine when a user posts a comment in response to a given media content item and can store information describing this relationship. In some embodiments, such information can be stored in a social graph as described in reference to FIG. 5.

In some embodiments, the graphical overlay module 110 is configured to provide options for augmenting objects represented in media content items. More details regarding the graphical overlay module 110 will be provided below with reference to FIG. 2A.

Figure 2A:
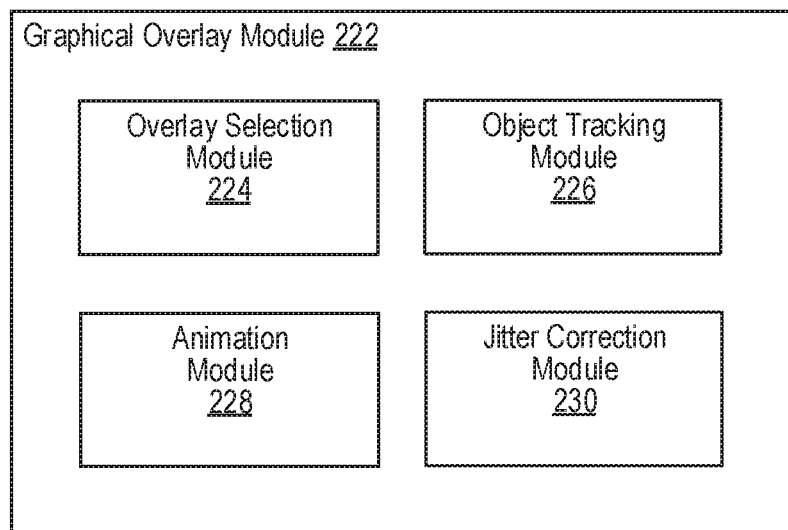
FIG. 2A illustrates an example graphical overlay module, according to an embodiment of the present disclosure.

FIG. 2A illustrates a graphical overlay module 222, according to an embodiment of the present disclosure. In some embodiments, the graphical overlay module 110 of FIG. 1 can be implemented with the graphical overlay module 222. As shown in the example of FIG. 2A, the graphical overlay module 222 can include an overlay selection module 224, an object tracking module 226, an animation module 228, and a jitter correction module 230.

In general, users of the social networking system can post media content items (e.g., images, videos, looping videos, live content streams) in which various objects are represented (e.g., human faces, pets, vehicles, etc.). In some embodiments, users have the option to apply graphical overlays (e.g., masks, environmental animations) to various objects represented in media content items. In some embodiments, a graphical overlay can visually augment (or modify) the appearance of one or more objects represented in media content items. For example, in various embodiments, a graphical overlay may be applied to visually augment the appearance of human faces and/or an environment represented in a video or live content stream. When a graphical overlay is applied to an object (e.g., human face) in a media content item, users accessing the media content item through the social networking system are shown a visually augmented version of the object with the graphical overlay being positioned relative to the object. In some embodiments, the applied graphical overlay can be animated based on changes to the object's position and/or orientation across frames of the media content item.

The overlay selection module 224 can provide an interface through which users can select various graphical overlays (e.g., masks, environmental animations) to be applied to objects represented in media content items. In some embodiments, a user can access the interface through a software application running on a computing device. The interface can provide a number of graphical overlays that are available for use. The user operating the computing device can select a graphical overlay to be applied to one or more objects represented in a given media content item. Additional details describing various example graphical overlays that may be applied to objects are provided below in reference to FIGS. 3A-3N.

In some embodiments, once a graphical overlay is selected, the object tracking module 226 can identify objects (e.g., human faces) represented in the media content item to which the graphical overlay is being applied. The object tracking module 226 can apply generally known object detection techniques to identify objects represented in the media content item. For example, in some embodiments, the object tracking module 226 can apply generally known face detection techniques to identify human faces represented in the media content item. Many variations are possible.

Once objects have been identified, the object tracking module 226 can also track the identified objects across frames of the media content item. For example, the object tracking module 226 can track identified human faces as their positions change across frames of the media content item. In some embodiments, when tracking a human face, the object tracking module 226 can also determine changes to a depth and angle of the human face across frames of the media content item. There are many well-known approaches for detecting and tracking objects in real-time. In general, the object tracking module 226 can apply any generally known object tracking and/or video tracking techniques. In some embodiments, such object tracking and/or video tracking techniques may be performed, in part, using cameras associated with user computing devices being used to capture and share media content items. Further, the object tracking module 226 can also apply generally known depth estimation techniques including both software- and camera-based approaches.

The animation module 228 can be configured to visually augment one or more objects being tracked in a media content item using a selected graphical overlay. In some embodiments, the animation module 228 can insert the selected graphical overlay at a position corresponding to an object being tracked. For example, the animation module 228 can insert a mask (e.g., a crown, mustache, rabbit ears, etc.) at a position that corresponds to a human face being tracked in a media content item. In this example, the animation module 228 can continually adjust (or re-position) the location of the mask based on changes to the position and orientation of the human face across frames of the media content item.

In some embodiments, the animation module 228 can insert a graphical overlay based on actions performed by one or more objects being tracked in a media content item. For example, in some embodiments, the animation module 228 can insert a graphical overlay when a tracked object performs some pre-defined gesture. For example, the animation module 228 can insert an environmental animation that displays a series of hearts when a pair of human faces are positioned cheek-to-cheek in one or more frames of a media content item. Many variations are possible.

In some embodiments, the animation module 228 can insert a graphical overlay based on changes to a distance (or depth) of one or more objects being tracked in a media content item. For example, in some embodiments, the animation module 228 can determine (or estimate) changes to a depth of a tracked object across one or more frames of a media content item. In some embodiments, the animation module 228 can insert different graphical overlays based on determined (or estimated) changes to a depth of the tracked object across frames of the media content item. For example, in some embodiments, the animation module 228 can insert a first graphical overlay when the tracked object is located at a first threshold depth in one or more frames of the media content item. In such embodiments, the animation module 228 can transition from the first graphical overlay to a second graphical overlay when the tracked object relocates to a second threshold depth in one or more subsequent frames of the media content item. Many variations are possible. Additional details describing such depth-based animations are provided below in reference to FIGS. 3M-3N.

In some embodiments, the animation module 228 can animate a graphical overlay being applied to an object based on changes to an orientation of the object in one or more frames of a media content item. For example, a graphical overlay representing rabbit ears may be applied at anchor points located on top of a human head. In this example, the animation module 228 can continually animate the rabbit ears over time based on detected changes to orientation of the anchor points, which correspond to changes to an orientation (e.g., position and/or angle) of the human head. In some embodiments, a graphical overlay can be animated using a pre-rendered set of video frames that capture various animations of the graphical overlay. For example, a pre-rendered set of video frames can capture various animations of rabbit ears. In some embodiments, the pre-rendered set of video frames can be divided into segments of frames. In such embodiments, each segment of frames can represent some animation of the graphical overlay that corresponds to a pre-defined orientation (e.g., position and/or angle). For example, a segment of frames may represent some animation of the rabbit ears that can be shown when a human head corresponds to some pre-defined orientation. In this example, when a human head being tracked satisfies the pre-defined orientation, the animation module 228 can identify the segment of frames that corresponds to that pre-defined orientation. The animation module 228 can then animate the rabbit ears by playing (or scrubbing) that segment of frames. Additional details describing the animation of graphical overlays are provided below in reference to FIG. 3O.

The jitter correction module 230 can be configured to remedy, or reduce, animation jitter in media content items. More details regarding the jitter correction module 230 will be provided below with reference to FIG. 2B.

Figure 2B:
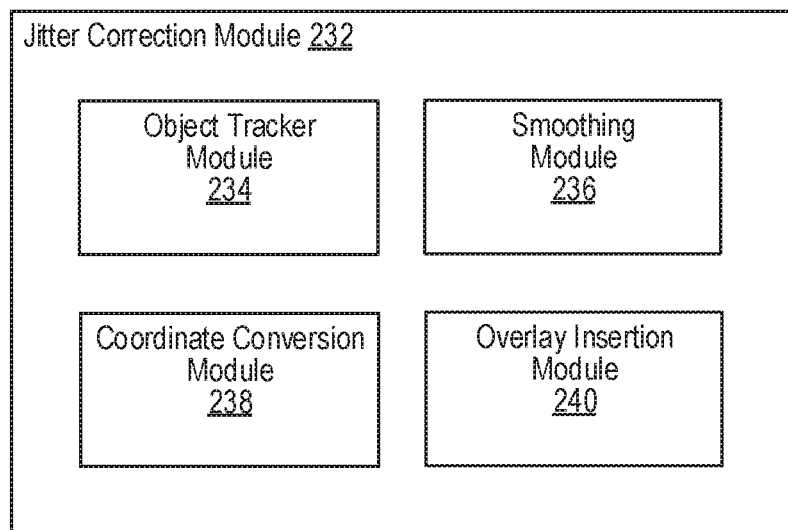
FIG. 2B illustrates an example jitter correction module, according to an embodiment of the present disclosure.

FIG. 2B illustrates a jitter correction module 232, according to an embodiment of the present disclosure. In some embodiments, the jitter correction module 230 of FIG. 2A can be implemented with the jitter correction module 232. As shown in the example of FIG. 2B, the jitter correction module 232 can include an object tracker module 234, a smoothing module 236, a coordinate conversion module 238, and an overlay insertion module 240.

The object tracker module 234 can be configured to identify and track objects (e.g., human faces) as represented in frames being captured by one or more cameras of a computing device. In some embodiments, when an object is identified, the object tracker module 234 can determine transformations of the object in an object tracking coordinate space. The transformations can describe positions of the object in three-dimensional space using x, y, and z coordinates. Further, the transformations can also describe rotations of the object along an x, y, and z axis. In some instances, jitter may result as the object tracker module 234 tracks movement of the object. In some embodiments, the transformations of the object can be smoothed to correct (or reduce) jitter.

The smoothing module 236 can apply a smoothing to the transformations of the object. In some embodiments, the smoothing module 236 obtains values describing transformations of the object in world coordinate space (e.g., transformations relative to the camera(s) of the computing device). These values can be obtained from the object tracker module 234, for example. In some embodiments, the smoothing module 236 applies exponential smoothing to the values describing the transformations of the object in world coordinate space.

The coordinate conversion module 238 can translate the smoothed values outputted by the smoothing module 236 back to object tracking coordinate space.

Once translated, the overlay insertion module 240 can augment a representation of the object being tracked. For example, the overlay insertion module 240 can insert (or attach) a designated graphical overlay (e.g., rabbit ears) to corresponding anchor points on the object (e.g., human head) being tracked. In various embodiments, the graphical overlay is inserted based on the smoothed transformations of the object as represented in object tracking coordinate space. As a result, the initial jitter that resulted from tracking the object is eliminated (or reduced). Consequently, both the motion of the object and the animation of the inserted graphical overlay are smoothed and presented without jitter (or with reduced jitter).

Figure 3B:
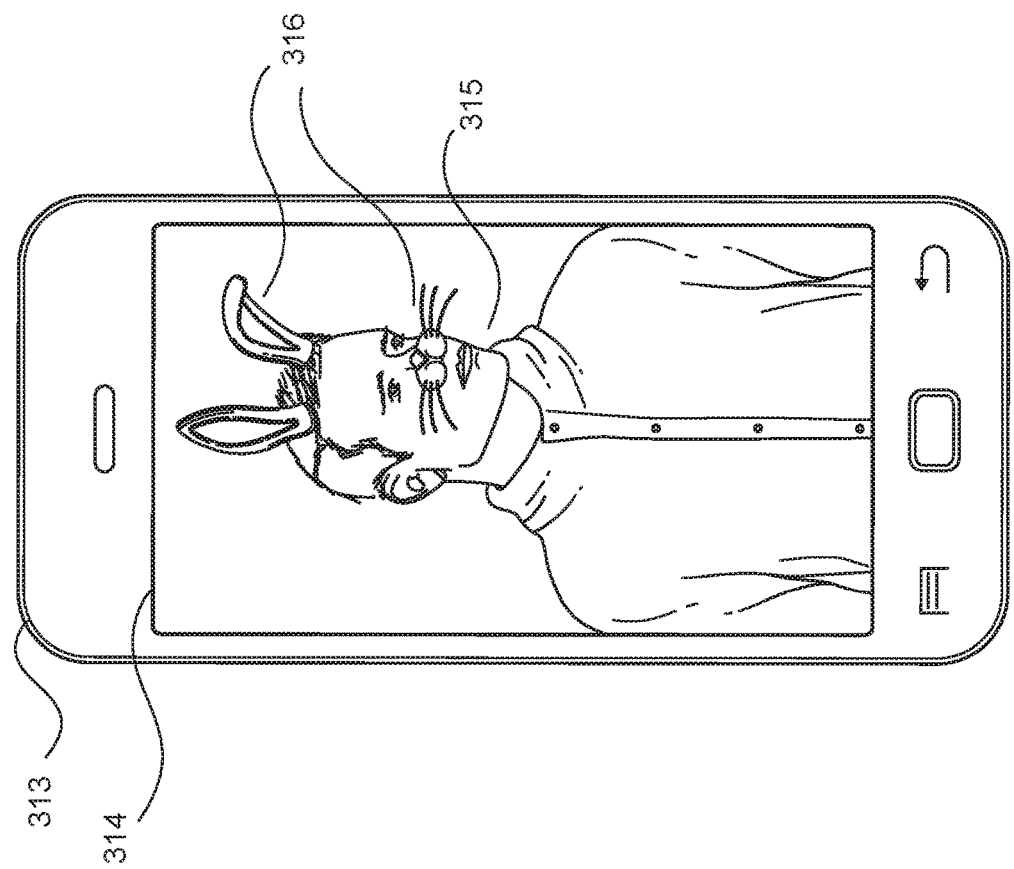
FIGS. 3A-3O illustrate example diagrams, according to embodiments of the present disclosure.
Figure 3A:
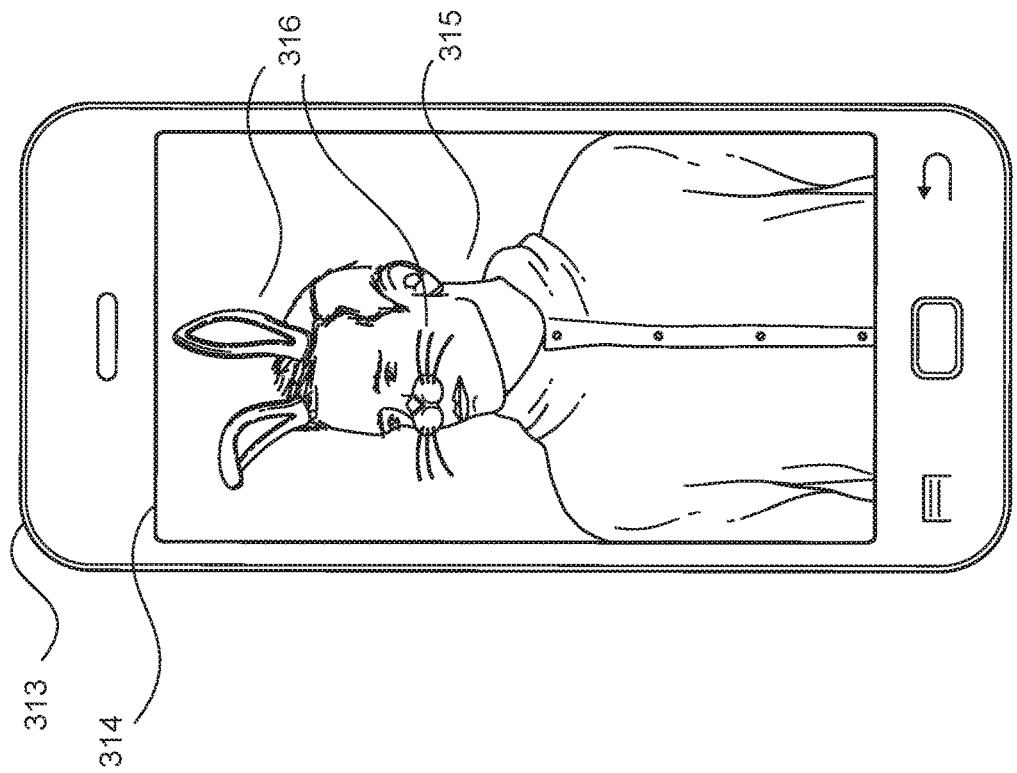

FIGS. 3A-3D illustrate an example of an interface 314, according to an embodiment of the present disclosure. In this example, the interface 314 is presented through a display screen of a computing device 313. Further, the interface 314 may be provided through an application (e.g., a web browser, a social networking application, messenger application, etc.) running on the computing device 313 that is configured to interact with a social networking system. FIG. 3A illustrates a human face 315 as represented in one or more frames. In this example, the representation of the human face 315 has been augmented using a graphical overlay 316 that corresponds to a rabbit nose and ears. In various embodiments, the location of the human face 315 can be tracked across subsequent frames. In some embodiments, the graphical overlay 316 can continually be adjusted (or re-positioned) based on changes to the position of the human face 315 across the subsequent frames, as illustrated in FIGS. 3B-3D. In some embodiments, the graphical overlay 316 can be animated based on changes to an orientation (e.g., position and/or angle) of the human face 315 across the subsequent frames. For example, the rabbit ears can animate as the human face 315 changes from one direction to another, as illustrated in FIGS. 3B-3D. In some embodiments, the graphical overlay 316 can animate in response to a gesture performed by the human face 315 being tracked. For example, the rabbit ears can extend when the eyes of the human face 315 being tracked are fully opened, as illustrated in the example of FIG. 3D. The example functionality described in connection with FIGS. 3A-3D can be implemented by the graphical overlay module 110, as discussed above. Many variations are possible.

Figure 3E:
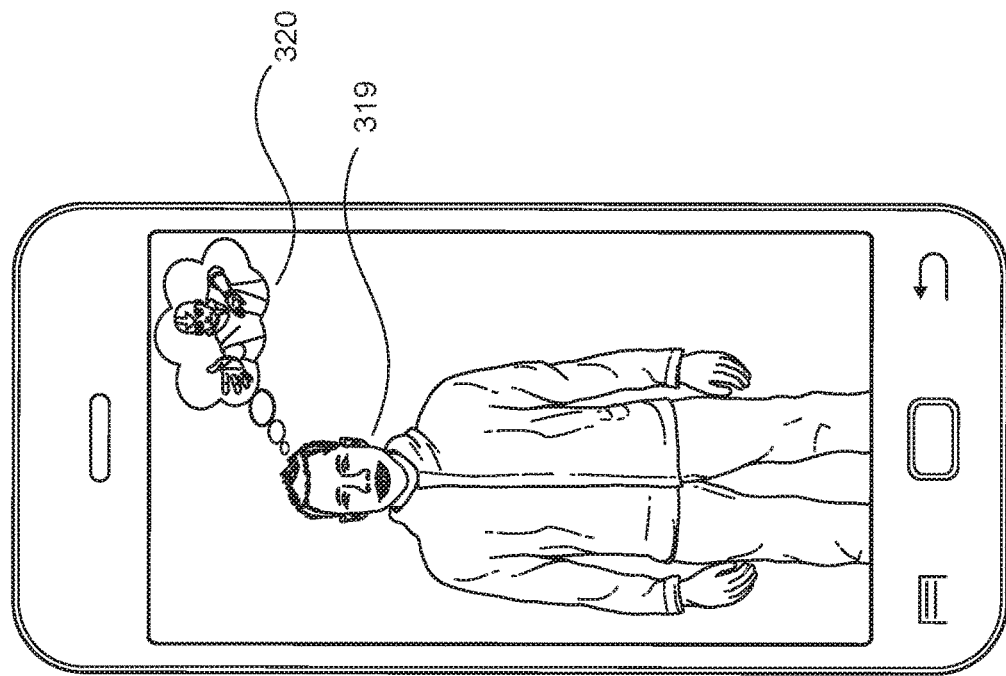
Figure 3F:
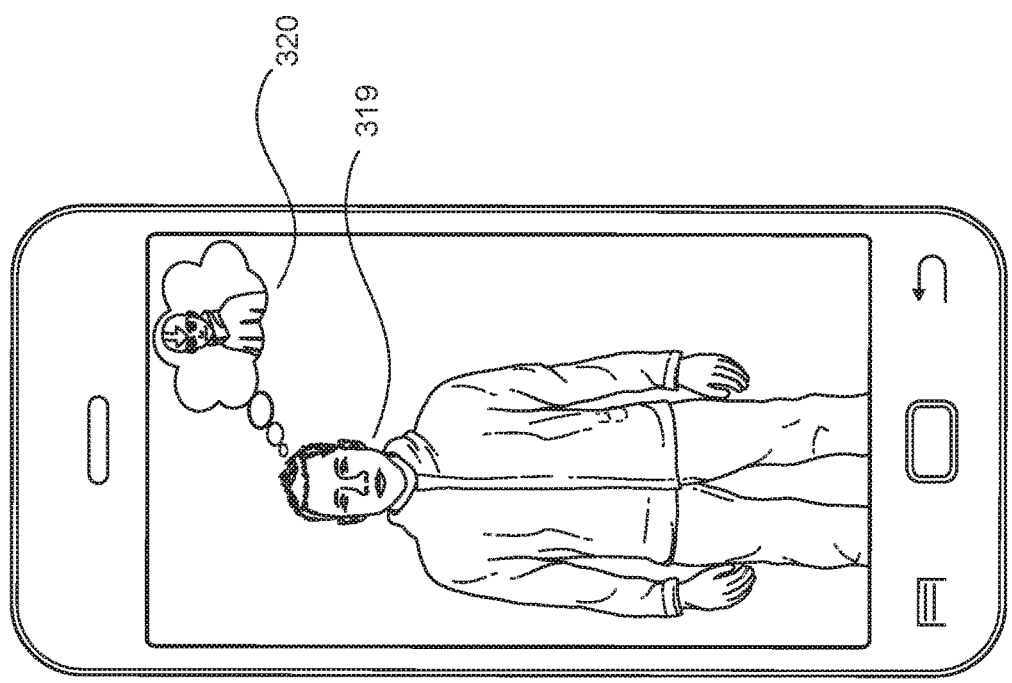

FIG. 3E illustrates another example application of a graphical overlay. In FIG. 3E, a graphical overlay 320 representing a thought bubble is positioned over the head of an individual 319 being tracked. In this example, the thought bubble includes an avatar that animates based on actions performed by the tracked individual 319. For example, in some embodiments, the avatar can animate based on changes to the individual's facial expressions, as illustrated in the example of FIG. 3F. In some embodiments, the avatar can mimic facial expressions and/or body expressions of the individual 319. The example functionality described in connection with FIGS. 3E-3F can be implemented by the graphical overlay module 110, as discussed above. Many variations are possible.

Figure 3H:
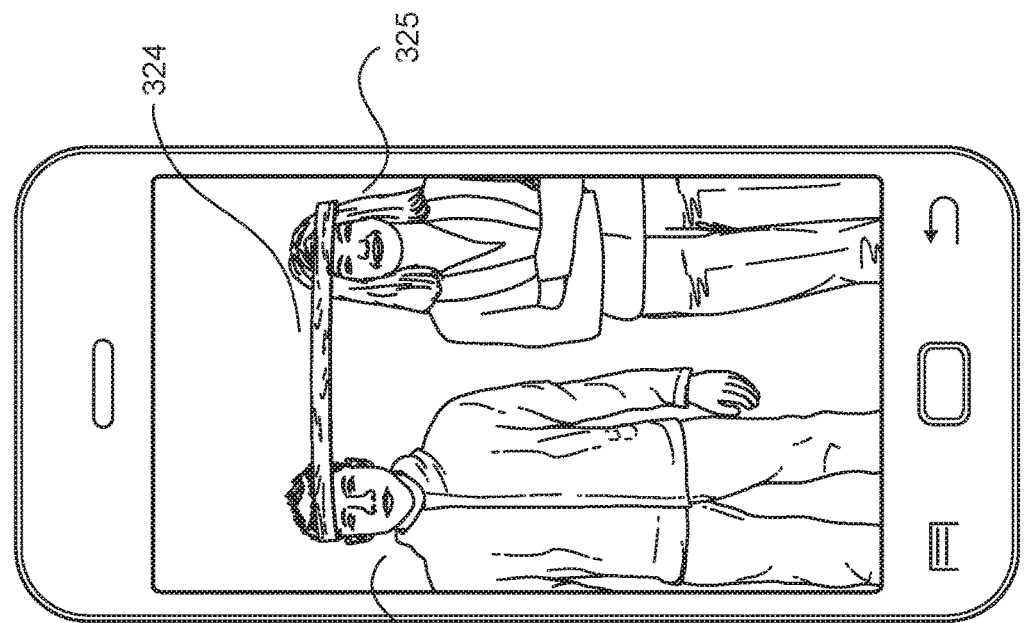
Figure 3G:
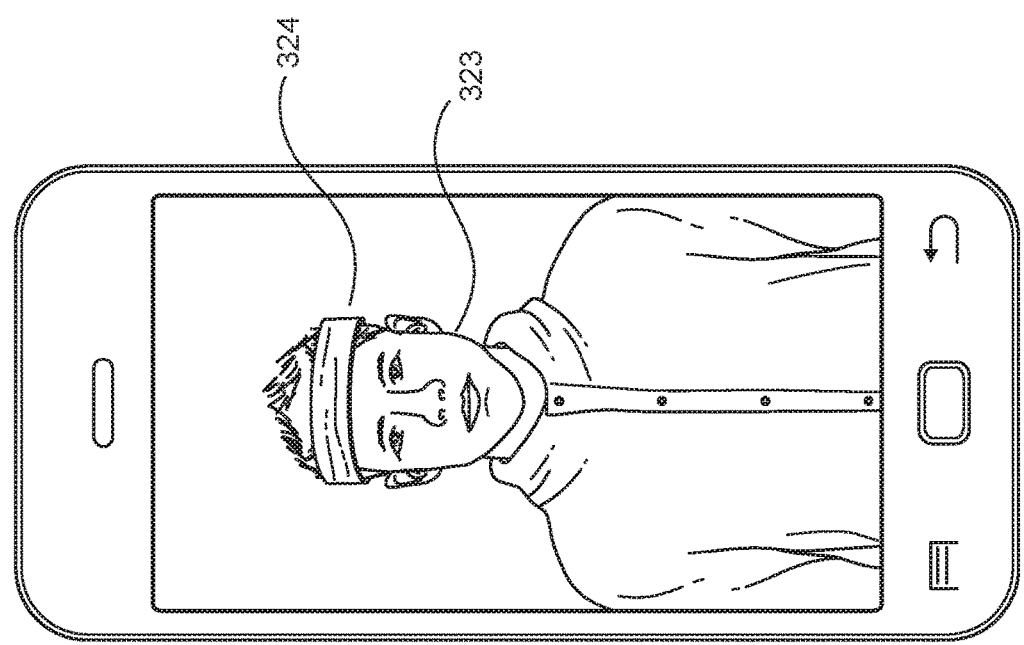

FIG. 3G illustrates another example application of a graphical overlay. In FIG. 3G, a graphical overlay 324 representing a sweatband is positioned over the head of an individual 323 being tracked. In some embodiments, graphical overlays can be animated based on the presence of additional individuals. For example, when a second individual 325 is identified, the graphical overlay 324 representing the sweatband can be extended to include both the forehead of the individual 323 and the forehead of the second individual 325, as illustrated in the example of FIG. 3H. The example functionality described in connection with FIGS. 3G-3H can be implemented by the graphical overlay module 110, as discussed above. Many variations are possible.

Figure 3J:
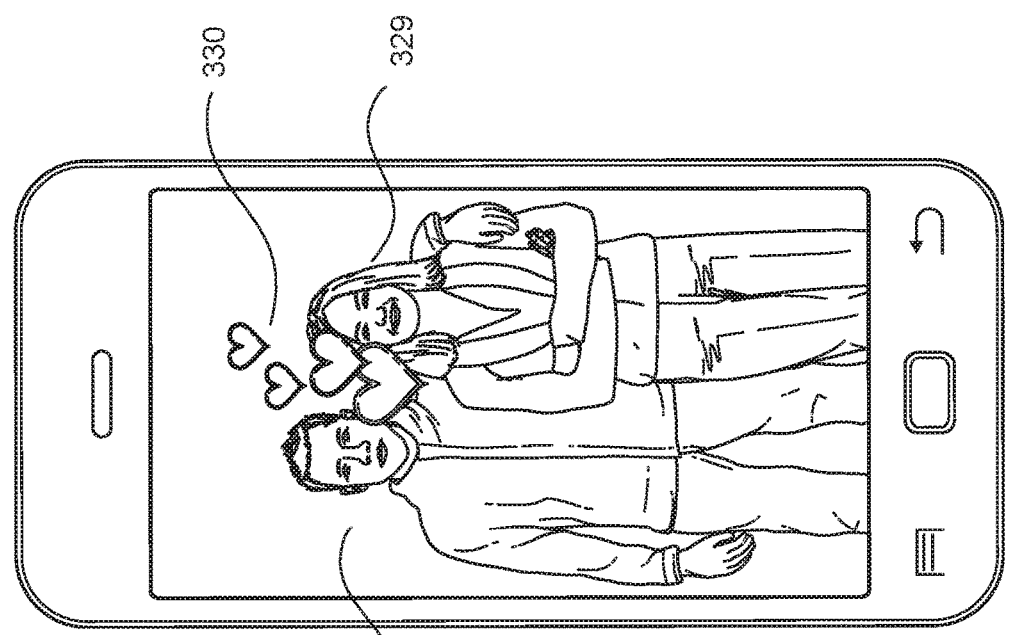
Figure 3I:
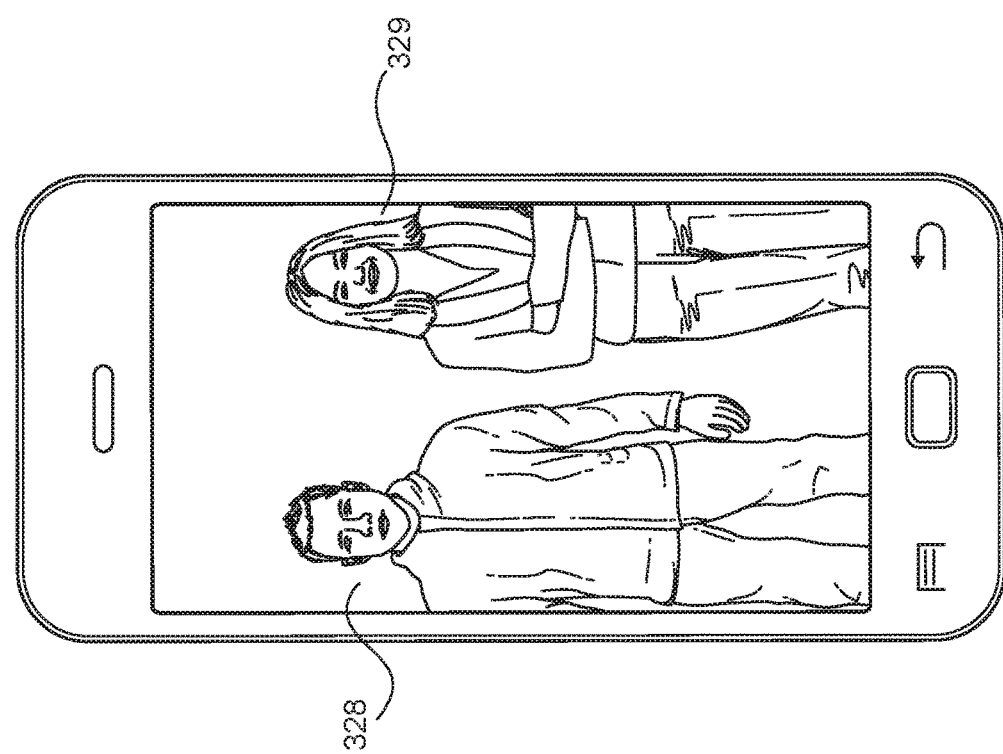

FIGS. 3I-3J illustrate yet another example application of a graphical overlay. In some embodiments, graphical overlays can be animated based on gestures performed by one or more tracked individuals. In FIGS. 3I-3J, a graphical overlay 330 representing a series of hearts appears in response to a first individual 328 and a second individual 329 positioning themselves (or their faces) to be within a threshold distance from one another (e.g., cheek-to-cheek). The example functionality described in connection with FIGS. 3I-3J can be implemented by the graphical overlay module 110, as discussed above. Many variations are possible.

FIGS. 3K-3L illustrate another example application of a graphical overlay. In FIGS. 3K-3L, a graphical overlay 334 representing an ice cream cone is positioned near the mouth of a first individual 333. In some embodiments, the graphical overlay 334 can be shown when the first individual 333 opens his mouth. As mentioned, in some embodiments, graphical overlays can be animated based on gestures performed by one or more individuals. In the example of FIG. 3L, the graphical overlay 334 representing the ice cream cone is tossed on the first individual's head when the first individual 333 closes his mouth. The example functionality described in connection with FIGS. 3K-3L can be implemented by the graphical overlay module 110, as discussed above. Many variations are possible.

FIGS. 3M-3N illustrate an example application of depth-based graphical overlays. As mentioned, in some embodiments, a first graphical overlay can be shown when a tracked object (e.g., human face) is located at a first threshold depth in one or more frames. In such embodiments, the first graphical overlay can transition to a second graphical overlay when the object relocates to a second threshold depth in one or more subsequent frames. In the example of FIG. 3M, a first graphical overlay 338 representing spotlights is positioned over an individual 337 that is determined to be located at a first threshold depth. In this example, the first graphical overlay 338 transitions to a second graphical overlay 339 representing peacock feathers when the individual 337 is determined to be located at a second threshold depth, as illustrated in the example of FIG. 3N. The example functionality described in connection with FIGS. 3M-3N can be implemented by the graphical overlay module 110, as discussed above. Many variations are possible.

Figure 3O:
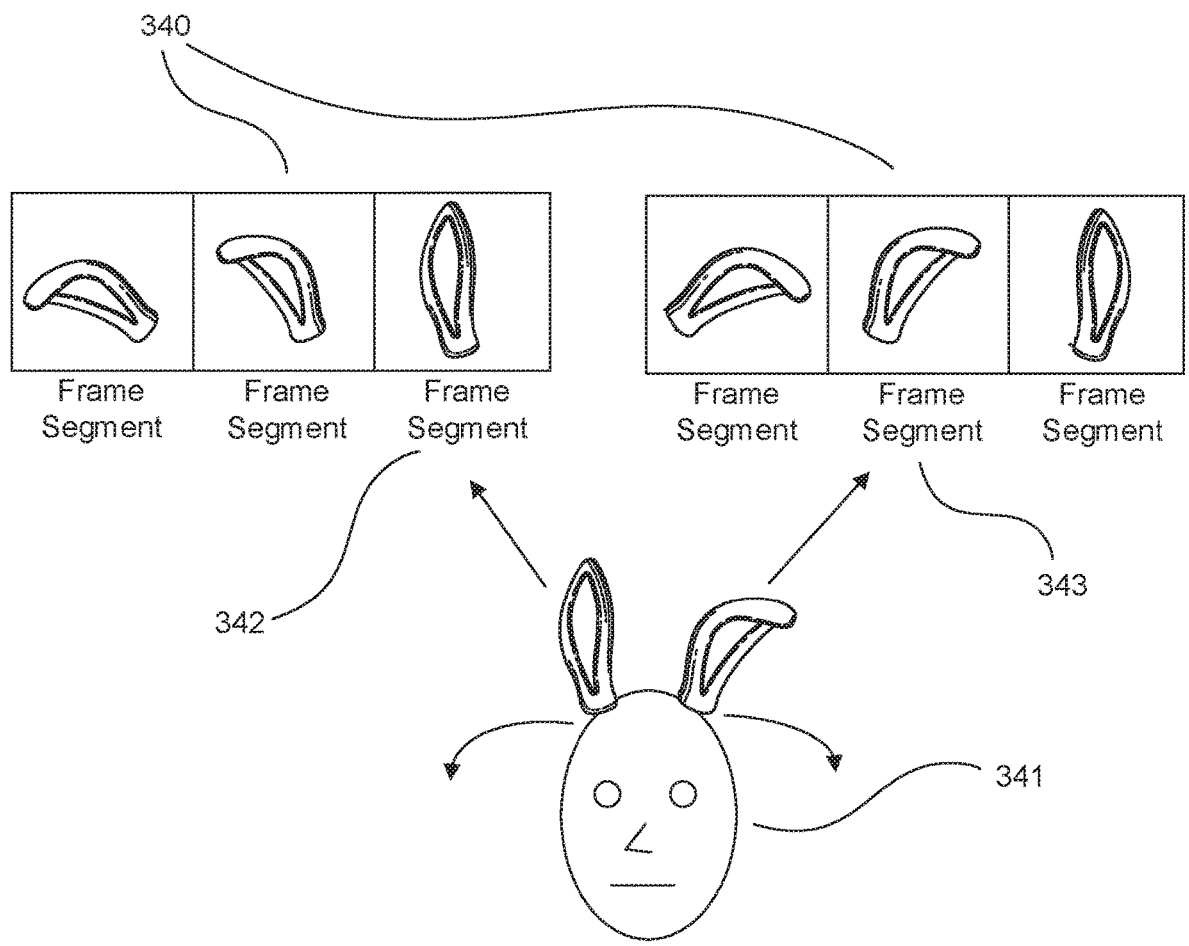

FIG. 3O illustrates an example approach for animating graphical overlays (e.g., masks). As mentioned, in some embodiments, a graphical overlay can be animated using a pre-rendered set of video frames that capture various animations of the graphical overlay. For example, a pre-rendered set of video frames can capture various animations of rabbit ears, as illustrated in FIG. 3O. In some embodiments, the pre-rendered set of video frames can be divided into segments of frames 340. In some embodiments, each segment of frames includes some pre-defined number of frames (e.g., 3 to 9 frames) that correspond to a given animation. Further, each segment of frames can represent some animation of the graphical overlay that corresponds to a pre-defined object orientation (e.g., position and/or angle). For example, as shown in FIG. 3O, each segment of frames 340 can represent some animation of the rabbit ears for a pre-defined orientation (e.g., position and/or angle) of a human head 341. In various embodiments, when the human head 341 is positioned at a particular orientation, one or more segments of frames 342, 343 corresponding to that orientation can be replayed (or scrubbed) to produce the animation. In general, this approach can be used to animate many different types of graphical overlays. For example, this approach can be used to animate a graphical overlay representing a set of reflective stars. The example functionality described in connection with FIG. 3O can be implemented by the graphical overlay module 110, as discussed above.

Figure 4A:
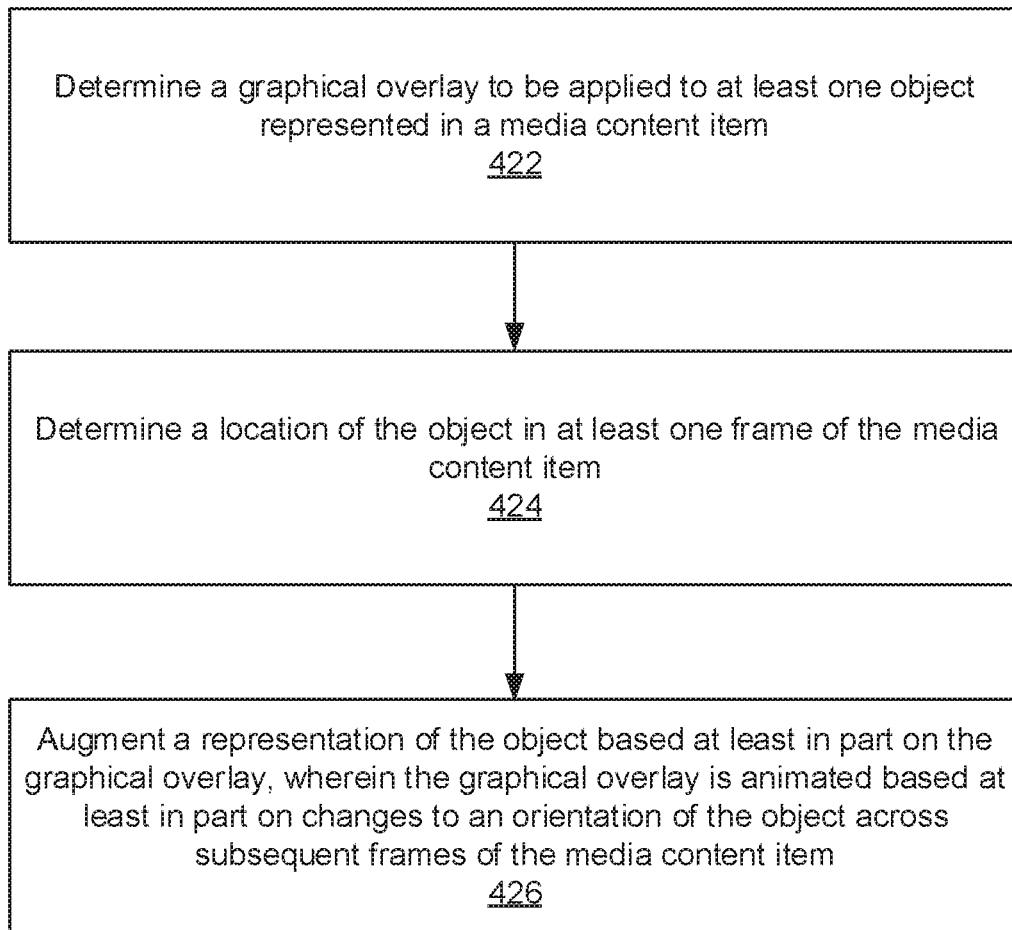
FIGS. 4A-4C illustrate example methods, according to embodiments of the present disclosure.

FIG. 4A illustrates an example method, according to an embodiment of the present disclosure. It should be appreciated that there can be additional, fewer, or alternative steps performed in similar or alternative orders, or in parallel, within the scope of the various embodiments discussed herein unless otherwise stated.

At block 422, a graphical overlay to be applied to at least one object represented in a media content item is determined. At block 424, a location of the object in at least one frame of the media content item is determined. At block 426, a representation of the object is augmented based at least in part on the graphical overlay. The graphical overlay is animated based at least in part on changes to an orientation of the object across subsequent frames of the media content item.

Figure 4B:
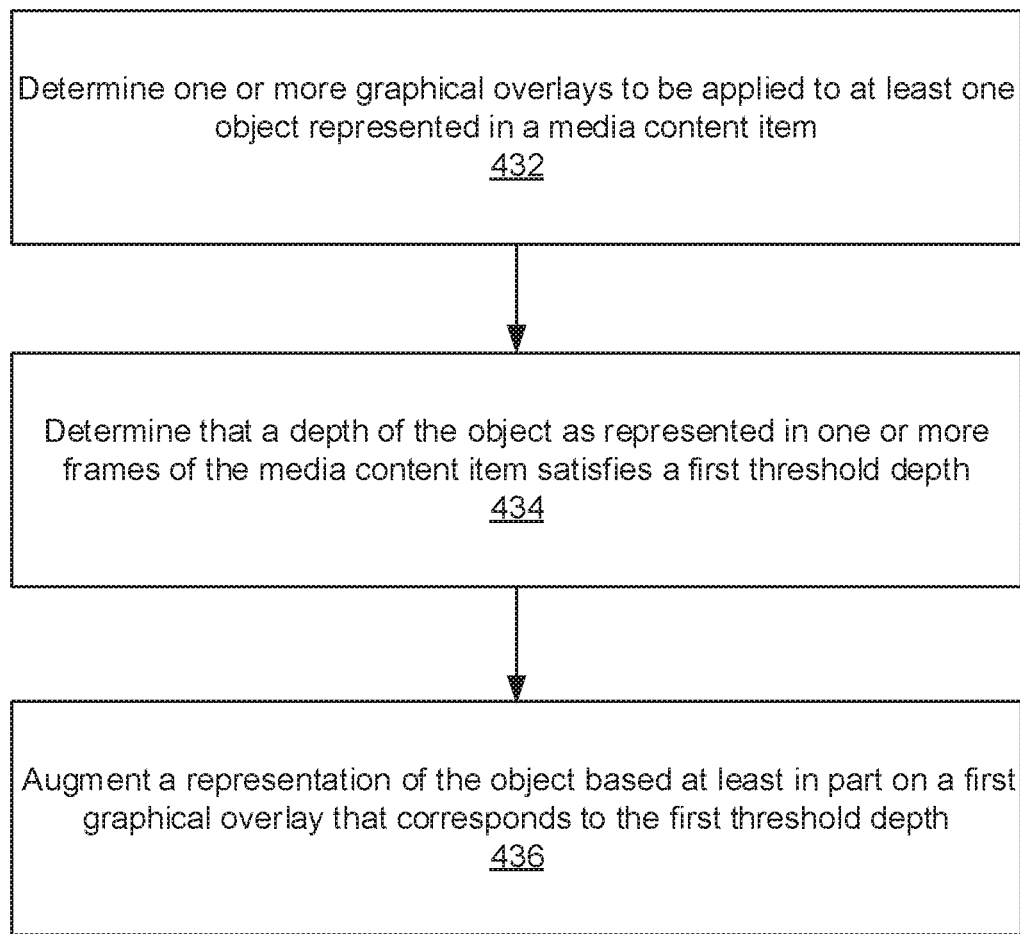

FIG. 4B illustrates an example method, according to an embodiment of the present disclosure. It should be appreciated that there can be additional, fewer, or alternative steps performed in similar or alternative orders, or in parallel, within the scope of the various embodiments discussed herein unless otherwise stated.

At block 432, one or more graphical overlays to be applied to at least one object represented in a media content item are determined. At block 434, a determination is made that a depth of the object as represented in one or more frames of the media content item satisfies a first threshold depth. At block 436, a representation of the object is augmented based at least in part on a first graphical overlay that corresponds to the first threshold depth.

Figure 4C:
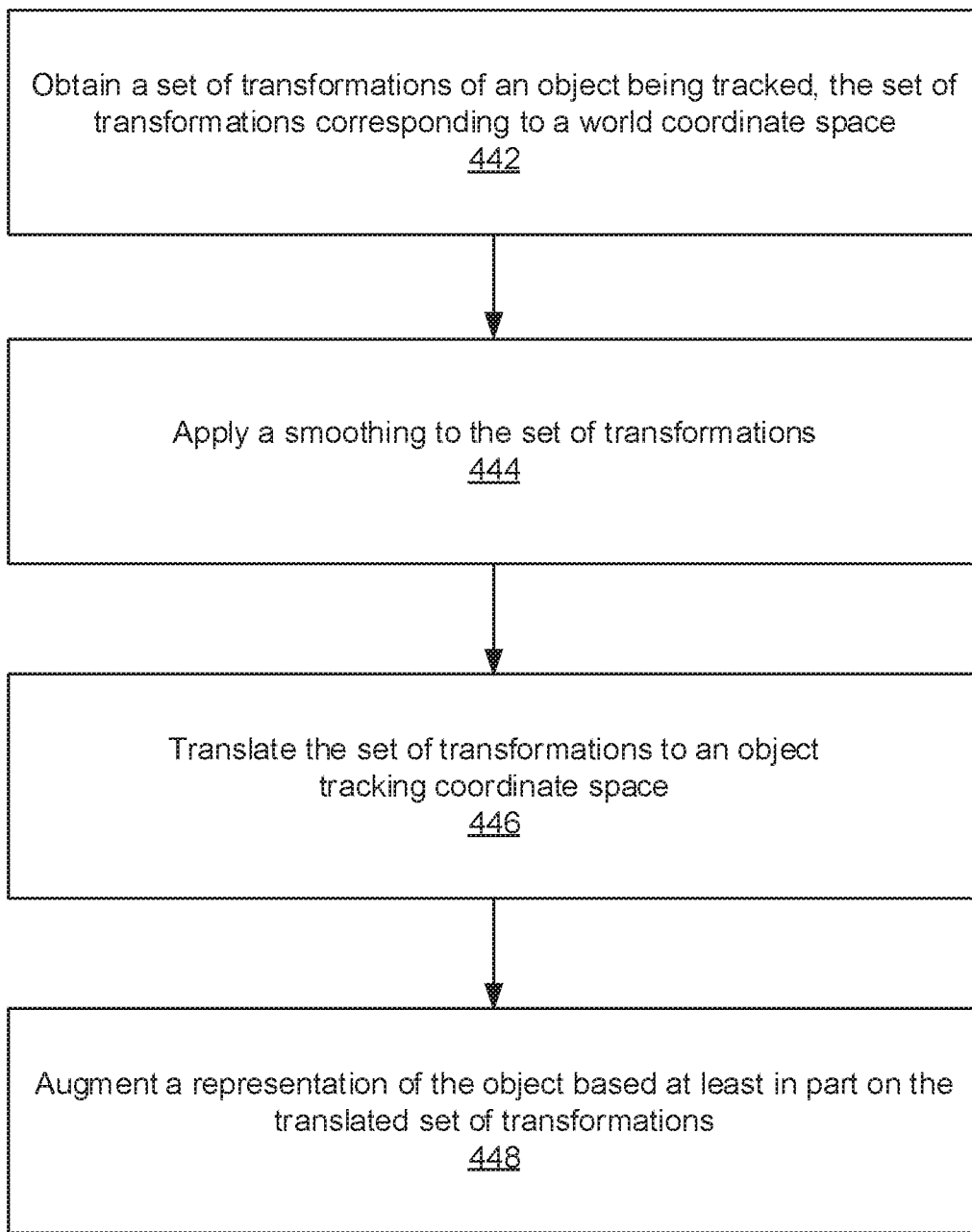

FIG. 4C illustrates an example method, according to an embodiment of the present disclosure. It should be appreciated that there can be additional, fewer, or alternative steps performed in similar or alternative orders, or in parallel, within the scope of the various embodiments discussed herein unless otherwise stated.

At block 442, a set of transformations of an object being tracked are obtained. The set of transformations can correspond to a world coordinate space. At block 444, a smoothing is applied to the set of transformations. At block 446, the set of transformations are translated to an object tracking coordinate space. At block 448, a representation of the object based is augmented at least in part on the translated set of transformations.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 5:
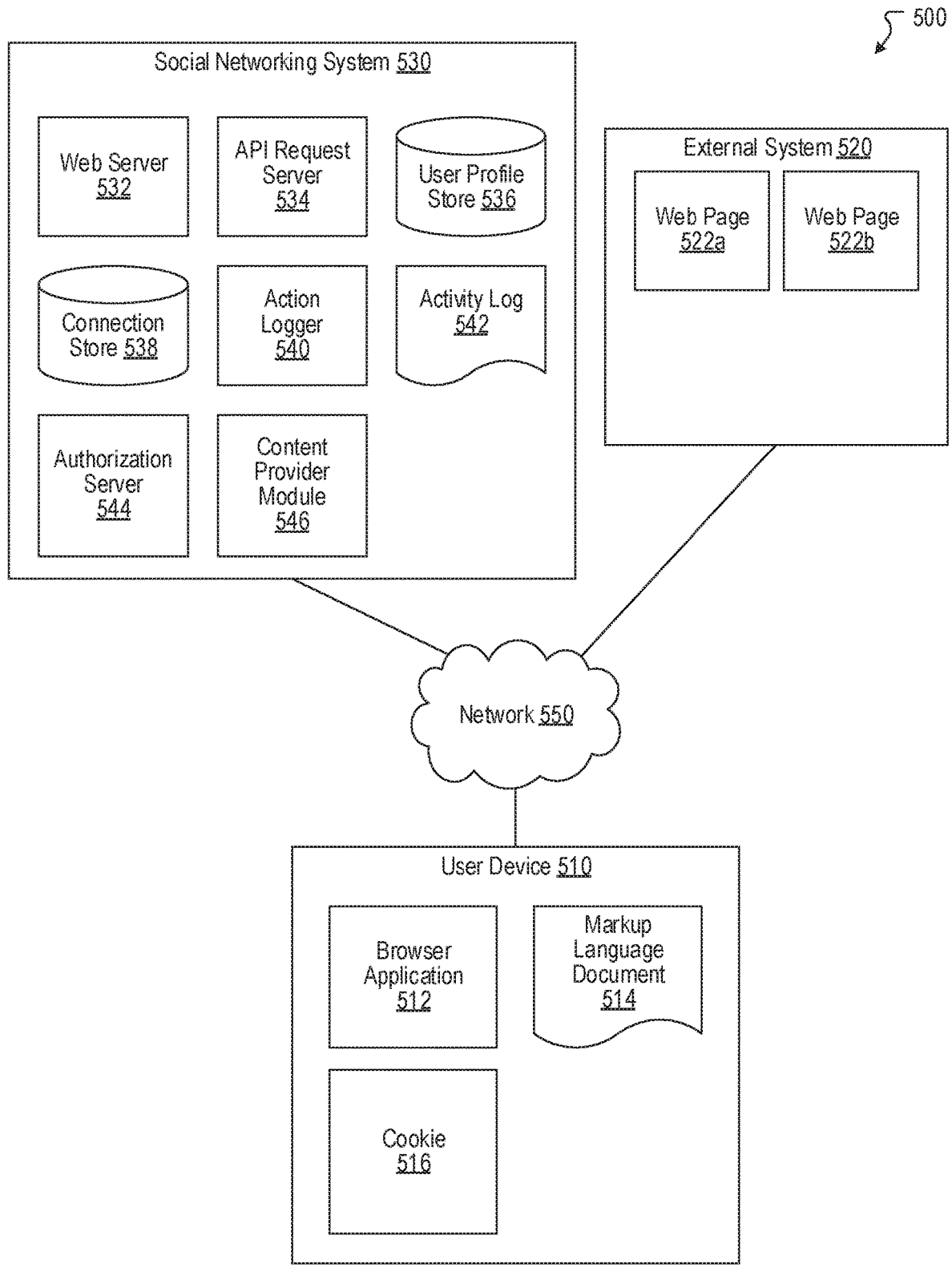
FIG. 5 illustrates a network diagram of an example system including an example social networking system that can be utilized in various scenarios, according to an embodiment of the present disclosure.

FIG. 5 illustrates a network diagram of an example system 500 that can be utilized in various scenarios, in accordance with an embodiment of the present disclosure. The system 500 includes one or more user devices 510, one or more external systems 520, a social networking system (or service) 530, and a network 550. In an embodiment, the social networking service, provider, and/or system discussed in connection with the embodiments described above may be implemented as the social networking system 530. For purposes of illustration, the embodiment of the system 500, shown by FIG. 5, includes a single external system 520 and a single user device 510. However, in other embodiments, the system 500 may include more user devices 510 and/or more external systems 520. In certain embodiments, the social networking system 530 is operated by a social network provider, whereas the external systems 520 are separate from the social networking system 530 in that they may be operated by different entities. In various embodiments, however, the social networking system 530 and the external systems 520 operate in conjunction to provide social networking services to users (or members) of the social networking system 530. In this sense, the social networking system 530 provides a platform or backbone, which other systems, such as external systems 520, may use to provide social networking services and functionalities to users across the Internet.

The user device 510 comprises one or more computing devices (or systems) that can receive input from a user and transmit and receive data via the network 550. In one embodiment, the user device 510 is a conventional computer system executing, for example, a Microsoft Windows compatible operating system (OS), Apple OS X, and/or a Linux distribution. In another embodiment, the user device 510 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 510 is configured to communicate via the network 550. The user device 510 can execute an application, for example, a browser application that allows a user of the user device 510 to interact with the social networking system 530. In another embodiment, the user device 510 interacts with the social networking system 530 through an application programming interface (API) provided by the native operating system of the user device 510, such as iOS and ANDROID. The user device 510 is configured to communicate with the external system 520 and the social networking system 530 via the network 550, which may comprise any combination of local area and/or wide area networks, using wired and/or wireless communication systems.

In one embodiment, the network 550 uses standard communications technologies and protocols. Thus, the network 550 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 550 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 550 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 510 may display content from the external system 520 and/or from the social networking system 530 by processing a markup language document 514 received from the external system 520 and from the social networking system 530 using a browser application 512. The markup language document 514 identifies content and one or more instructions describing formatting or presentation of the content. By executing the instructions included in the markup language document 514, the browser application 512 displays the identified content using the format or presentation described by the markup language document 514. For example, the markup language document 514 includes instructions for generating and displaying a web page having multiple frames that include text and/or image data retrieved from the external system 520 and the social networking system 530. In various embodiments, the markup language document 514 comprises a data file including extensible markup language (XML) data, extensible hypertext markup language (XHTML) data, or other markup language data. Additionally, the markup language document 514 may include JavaScript Object Notation (JSON) data, JSON with padding (JSONP), and JavaScript data to facilitate data-interchange between the external system 520 and the user device 510. The browser application 512 on the user device 510 may use a JavaScript compiler to decode the markup language document 514.

The markup language document 514 may also include, or link to, applications or application frameworks such as FLASH™ or Unity™ applications, the Silverlight™ application framework, etc.

In one embodiment, the user device 510 also includes one or more cookies 516 including data indicating whether a user of the user device 510 is logged into the social networking system 530, which may enable modification of the data communicated from the social networking system 530 to the user device 510.

The external system 520 includes one or more web servers that include one or more web pages 522a, 522b, which are communicated to the user device 510 using the network 550. The external system 520 is separate from the social networking system 530. For example, the external system 520 is associated with a first domain, while the social networking system 530 is associated with a separate social networking domain. Web pages 522a, 522b, included in the external system 520, comprise markup language documents 514 identifying content and including instructions specifying formatting or presentation of the identified content. As discussed previously, it should be appreciated that there can be many variations or other possibilities.

The social networking system 530 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 530 may be administered, managed, or controlled by an operator. The operator of the social networking system 530 may be a human being, an automated application, or a series of applications for managing content, regulating policies, and collecting usage metrics within the social networking system 530. Any type of operator may be used.

Users may join the social networking system 530 and then add connections to any number of other users of the social networking system 530 to whom they desire to be connected. As used herein, the term "friend" refers to any other user of the social networking system 530 to whom a user has formed a connection, association, or relationship via the social networking system 530. For example, in an embodiment, if users in the social networking system 530 are represented as nodes in the social graph, the term "friend" can refer to an edge formed between and directly connecting two user nodes.

Connections may be added explicitly by a user or may be automatically created by the social networking system 530 based on common characteristics of the users (e.g., users who are alumni of the same educational institution). For example, a first user specifically selects a particular other user to be a friend. Connections in the social networking system 530 are usually in both directions, but need not be, so the terms "user" and "friend" depend on the frame of reference. Connections between users of the social networking system 530 are usually bilateral ("two-way"), or "mutual," but connections may also be unilateral, or "one-way." For example, if Bob and Joe are both users of the social networking system 530 and connected to each other, Bob and Joe are each other's connections. If, on the other hand, Bob wishes to connect to Joe to view data communicated to the social networking system 530 by Joe, but Joe does not wish to form a mutual connection, a unilateral connection may be established. The connection between users may be a direct connection; however, some embodiments of the social networking system 530 allow the connection to be indirect via one or more levels of connections or degrees of separation.

In addition to establishing and maintaining connections between users and allowing interactions between users, the social networking system 530 provides users with the ability to take actions on various types of items supported by the social networking system 530. These items may include groups or networks (i.e., social networks of people, entities, and concepts) to which users of the social networking system 530 may belong, events or calendar entries in which a user might be interested, computer-based applications that a user may use via the social networking system 530, transactions that allow users to buy or sell items via services provided by or through the social networking system 530, and interactions with advertisements that a user may perform on or off the social networking system 530. These are just a few examples of the items upon which a user may act on the social networking system 530, and many others are possible. A user may interact with anything that is capable of being represented in the social networking system 530 or in the external system 520, separate from the social networking system 530, or coupled to the social networking system 530 via the network 550.

The social networking system 530 is also capable of linking a variety of entities. For example, the social networking system 530 enables users to interact with each other as well as external systems 520 or other entities through an API, a web service, or other communication channels. The social networking system 530 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, media content items, web pages, groups, activities, messages, concepts, and any other things that can be represented by an object in the social networking system 530. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 530 modifies edges connecting the various nodes to reflect the relationships and interactions.

The social networking system 530 also includes user-generated content, which enhances a user's interactions with the social networking system 530. User-generated content may include anything a user can add, upload, send, or "post" to the social networking system 530. For example, a user communicates posts to the social networking system 530 from a user device 510. Posts may include data such as status updates or other textual data, location information, images such as photos, videos, links, music or other similar data and/or media. Content may also be added to the social networking system 530 by a third party. Content "items" are represented as objects in the social networking system 530. In this way, users of the social networking system 530 are encouraged to communicate with each other by posting text and media content items of various types of media through various communication channels. Such communication increases the interaction of users with each other and increases the frequency with which users interact with the social networking system 530.

The social networking system 530 includes a web server 532, an API request server 534, a user profile store 536, a connection store 538, an action logger 540, an activity log 542, and an authorization server 544. In an embodiment of the invention, the social networking system 530 may include additional, fewer, or different components for various applications. Other components, such as network interfaces, security mechanisms, load balancers, failover servers, management and network operations consoles, and the like are not shown so as to not obscure the details of the system.

The user profile store 536 maintains information about user accounts, including biographic, demographic, and other types of descriptive information, such as work experience, educational history, hobbies or preferences, location, and the like that has been declared by users or inferred by the social networking system 530. This information is stored in the user profile store 536 such that each user is uniquely identified. The social networking system 530 also stores data describing one or more connections between different users in the connection store 538. The connection information may indicate users who have similar or common work experience, group memberships, hobbies, or educational history. Additionally, the social networking system 530 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 530, such as non-person entities, buckets, cluster centers, images, interests, pages, external systems, concepts, and the like are also stored in the connection store 538.

The social networking system 530 maintains data about objects with which a user may interact. To maintain this data, the user profile store 536 and the connection store 538 store instances of the corresponding type of objects maintained by the social networking system 530. Each object type has information fields that are suitable for storing information appropriate to the type of object. For example, the user profile store 536 contains data structures with fields suitable for describing a user's account and information related to a user's account. When a new object of a particular type is created, the social networking system 530 initializes a new data structure of the corresponding type, assigns a unique object identifier to it, and begins to add data to the object as needed. This might occur, for example, when a user becomes a user of the social networking system 530, the social networking system 530 generates a new instance of a user profile in the user profile store 536, assigns a unique identifier to the user account, and begins to populate the fields of the user account with information provided by the user.

The connection store 538 includes data structures suitable for describing a user's connections to other users, connections to external systems 520 or connections to other entities. The connection store 538 may also associate a connection type with a user's connections, which may be used in conjunction with the user's privacy setting to regulate access to information about the user. In an embodiment of the invention, the user profile store 536 and the connection store 538 may be implemented as a federated database.

Data stored in the connection store 538, the user profile store 536, and the activity log 542 enables the social networking system 530 to generate the social graph that uses nodes to identify various objects and edges connecting nodes to identify relationships between different objects. For example, if a first user establishes a connection with a second user in the social networking system 530, user accounts of the first user and the second user from the user profile store 536 may act as nodes in the social graph. The connection between the first user and the second user stored by the connection store 538 is an edge between the nodes associated with the first user and the second user. Continuing this example, the second user may then send the first user a message within the social networking system 530. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 530 (or, alternatively, in an image maintained by another system outside of the social networking system 530). The image may itself be represented as a node in the social networking system 530. This tagging action may create edges between the first user and the second user as well as create an edge between each of the users and the image, which is also a node in the social graph. In yet another example, if a user confirms attending an event, the user and the event are nodes obtained from the user profile store 536, where the attendance of the event is an edge between the nodes that may be retrieved from the activity log 542. By generating and maintaining the social graph, the social networking system 530 includes data describing many different types of objects and the interactions and connections among those objects, providing a rich source of socially relevant information.

The web server 532 links the social networking system 530 to one or more user devices 510 and/or one or more external systems 520 via the network 550. The web server 532 serves web pages, as well as other web-related content, such as Java, JavaScript, Flash, XML, and so forth. The web server 532 may include a mail server or other messaging functionality for receiving and routing messages between the social networking system 530 and one or more user devices 510. The messages can be instant messages, queued messages (e.g., email), text and SMS messages, or any other suitable messaging format.

The API request server 534 allows one or more external systems 520 and user devices 510 to call access information from the social networking system 530 by calling one or more API functions. The API request server 534 may also allow external systems 520 to send information to the social networking system 530 by calling APIs. The external system 520, in one embodiment, sends an API request to the social networking system 530 via the network 550, and the API request server 534 receives the API request. The API request server 534 processes the request by calling an API associated with the API request to generate an appropriate response, which the API request server 534 communicates to the external system 520 via the network 550. For example, responsive to an API request, the API request server 534 collects data associated with a user, such as the user's connections that have logged into the external system 520, and communicates the collected data to the external system 520. In another embodiment, the user device 510 communicates with the social networking system 530 via APIs in the same manner as external systems 520.

The action logger 540 is capable of receiving communications from the web server 532 about user actions on and/or off the social networking system 530. The action logger 540 populates the activity log 542 with information about user actions, enabling the social networking system 530 to discover various actions taken by its users within the social networking system 530 and outside of the social networking system 530. Any action that a particular user takes with respect to another node on the social networking system 530 may be associated with each user's account, through information maintained in the activity log 542 or in a similar database or other data repository. Examples of actions taken by a user within the social networking system 530 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 530, the action is recorded in the activity log 542. In one embodiment, the social networking system 530 maintains the activity log 542 as a database of entries. When an action is taken within the social networking system 530, an entry for the action is added to the activity log 542. The activity log 542 may be referred to as an action log.

Additionally, user actions may be associated with concepts and actions that occur within an entity outside of the social networking system 530, such as an external system 520 that is separate from the social networking system 530. For example, the action logger 540 may receive data describing a user's interaction with an external system 520 from the web server 532. In this example, the external system 520 reports a user's interaction according to structured actions and objects in the social graph.

Other examples of actions where a user interacts with an external system 520 include a user expressing an interest in an external system 520 or another entity, a user posting a comment to the social networking system 530 that discusses an external system 520 or a web page 522a within the external system 520, a user posting to the social networking system 530 a Uniform Resource Locator (URL) or other identifier associated with an external system 520, a user attending an event associated with an external system 520, or any other action by a user that is related to an external system 520. Thus, the activity log 542 may include actions describing interactions between a user of the social networking system 530 and an external system 520 that is separate from the social networking system 530.

The authorization server 544 enforces one or more privacy settings of the users of the social networking system 530. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 520, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 520. One embodiment allows the specification of the set of entities to comprise an enumeration of entities. For example, the user may provide a list of external systems 520 that are allowed to access certain information. Another embodiment allows the specification to comprise a set of entities along with exceptions that are not allowed to access the information. For example, a user may allow all external systems 520 to access the user's work information, but specify a list of external systems 520 that are not allowed to access the work information. Certain embodiments call the list of exceptions that are not allowed to access certain information a "block list". External systems 520 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 544 contains logic to determine if certain information associated with a user can be accessed by a user's friends, external systems 520, and/or other applications and entities. The external system 520 may need authorization from the authorization server 544 to access the user's more private and sensitive information, such as the user's work phone number. Based on the user's privacy settings, the authorization server 544 determines if another user, the external system 520, an application, or another entity is allowed to access information associated with the user, including information about actions taken by the user.

In some embodiments, the social networking system 530 can include a content provider module 546. The content provider module 546 can, for example, be implemented as the content provider module 102 of FIG. 1. In some embodiments, the content provider module 546, in whole or in part, may be implemented in a user device 510. As discussed previously, it should be appreciated that there can be many variations or other possibilities.

Hardware Implementation

Figure 6:
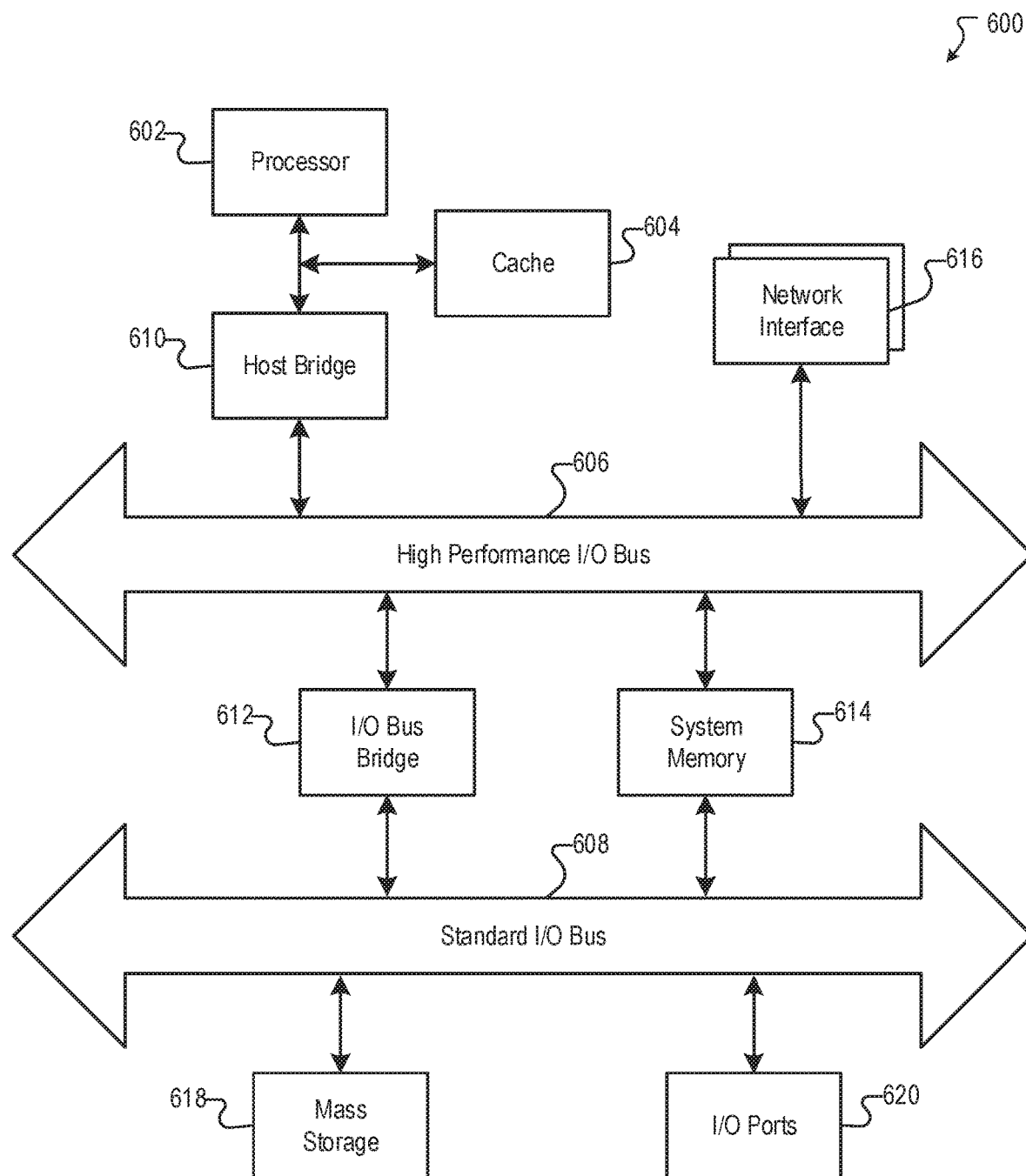
FIG. 6 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 6 illustrates an example of a computer system 600 that may be used to implement one or more of the embodiments described herein in accordance with an embodiment of the invention. The computer system 600 includes sets of instructions for causing the computer system 600 to perform the processes and features discussed herein. The computer system 600 may be connected (e.g., networked) to other machines. In a networked deployment, the computer system 600 may operate in the capacity of a server machine or a client machine in a client-server network environment, or as a peer machine in a peer-to-peer (or distributed) network environment. In an embodiment of the invention, the computer system 600 may be the social networking system 530, the user device 510, and the external system 620, or a component thereof. In an embodiment of the invention, the computer system 600 may be one server among many that constitutes all or part of the social networking system 530.

The computer system 600 includes a processor 602, a cache 604, and one or more executable modules and drivers, stored on a computer-readable medium, directed to the processes and features described herein. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 may further include video memory and a display device coupled to the video memory (not shown). Mass storage 618 and I/O ports 620 couple to the standard I/O bus 608. The computer system 600 may optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 may be one or more serial and/or parallel communication ports that provide communication between additional peripheral devices, which may be coupled to the computer system 600.

The computer system 600 may include a variety of system architectures, and various components of the computer system 600 may be rearranged. For example, the cache 604 may be on-chip with processor 602. Alternatively, the cache 604 and the processor 602 may be packed together as a "processor module", with processor 602 being referred to as the "processor core". Furthermore, certain embodiments of the invention may neither require nor include all of the above components. For example, peripheral devices coupled to the standard I/O bus 608 may couple to the high performance I/O bus 606. In addition, in some embodiments, only a single bus may exist, with the components of the computer system 600 being coupled to the single bus. Moreover, the computer system 600 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 600 that, when read and executed by one or more processors, cause the computer system 600 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 600, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 602. Initially, the series of instructions may be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, a set of transformations of an object being tracked, the set of transformations corresponding to a world coordinate space;
    applying, by the computing system, a smoothing to the set of transformations;
    translating, by the computing system, the set of transformations to an object tracking coordinate space; and
    augmenting, by the computing system, a representation of the object based at least in part on the translated set of transformations.

2. The computer-implemented method of claim 1, wherein the representation of the object is augmented using one or more graphical overlays.

3. The computer-implemented method of claim 2, wherein the graphical overlays are attached to one or more anchor points corresponding to the object.

4. The computer-implemented method of claim 1, wherein exponential smoothing is applied to the set of transformations.

5. The computer-implemented method of claim 1, wherein the set of transformations corresponding to the world coordinate space describe transformations of the object relative to at least one camera of a computing device being used to track the object.

6. The computer-implemented method of claim 1, wherein the set of transformations describe changes to a position and rotation of the object in three-dimensional space.

7. The computer-implemented method of claim 1, wherein the object being tracked corresponds to a human face.

8. A system comprising:
    at least one processor; and
    a memory storing instructions that, when executed by the at least one processor, cause the system to perform:
        obtaining a set of transformations of an object being tracked, the set of transformations corresponding to a world coordinate space;
        applying a smoothing to the set of transformations;
        translating the set of transformations to an object tracking coordinate space; and
        augmenting a representation of the object based at least in part on the translated set of transformations.

9. The system of claim 8, wherein the representation of the object is augmented using one or more graphical overlays.

10. The system of claim 9, wherein the graphical overlays are attached to one or more anchor points corresponding to the object.

11. The system of claim 8, wherein exponential smoothing is applied to the set of transformations.

12. The system of claim 8, wherein the set of transformations corresponding to the world coordinate space describe transformations of the object relative to at least one camera of a computing device being used to track the object.

13. The system of claim 8, wherein the set of transformations describe changes to a position and rotation of the object in three-dimensional space.

14. The system of claim 8, wherein the object being tracked corresponds to a human face.

15. A non-transitory computer-readable storage medium including instructions that, when executed by at least one processor of a computing system, cause the computing system to perform a method comprising:
 obtaining a set of transformations of an object being tracked, the set of transformations corresponding to a world coordinate space;
 applying a smoothing to the set of transformations;
 translating the set of transformations to an object tracking coordinate space; and
 augmenting a representation of the object based at least in part on the translated set of transformations.

16. The non-transitory computer-readable storage medium of claim 15, wherein the representation of the object is augmented using one or more graphical overlays.

17. The non-transitory computer-readable storage medium of claim 15, wherein the graphical overlays are attached to one or more anchor points corresponding to the object.

18. The non-transitory computer-readable storage medium of claim 15, wherein exponential smoothing is applied to the set of transformations.

19. The non-transitory computer-readable storage medium of claim 15, wherein the set of transformations corresponding to the world coordinate space describe transformations of the object relative to at least one camera of a computing device being used to track the object.

20. The non-transitory computer-readable storage medium of claim 15, wherein the set of transformations describe changes to a position and rotation of the object in three-dimensional space.

\* \* \* \* \*